(12) United States Patent
Wolff et al.

(10) Patent No.: US 10,242,690 B2
(45) Date of Patent: Mar. 26, 2019

(54) SYSTEM AND METHOD FOR SPEECH ENHANCEMENT USING A COHERENT TO DIFFUSE SOUND RATIO

(71) Applicant: NUANCE COMMUNICATIONS, INC., Burlintgon, MA (US)

(72) Inventors: Tobias Wolff, Neu-Ulm (DE); Timo Matheja, Ulm (DE); Markus Buck, Biberach (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/535,245

(22) PCT Filed: Dec. 12, 2014

(86) PCT No.: PCT/US2014/069943
§ 371 (c)(1),
(2) Date: Jun. 12, 2017

(87) PCT Pub. No.: WO2016/093854
PCT Pub. Date: Jun. 16, 2016

(65) Prior Publication Data
US 2017/0330580 A1 Nov. 16, 2017

(51) Int. Cl.
*G10L 21/0216* (2013.01)
*G10L 21/0208* (2013.01)
*H04B 1/62* (2006.01)
*H04R 3/00* (2006.01)

(52) U.S. Cl.
CPC ...... *G10L 21/0216* (2013.01); *G10L 21/0208* (2013.01); *H04B 1/62* (2013.01); *H04R 3/005* (2013.01); *G10L 2021/02166* (2013.01); *H04R 2430/21* (2013.01); *H04R 2430/23* (2013.01); *H04R 2430/25* (2013.01)

(58) Field of Classification Search
CPC .................................................. G10L 21/0216
USPC ........................................................ 704/226
See application file for complete search history.

(56) References Cited

U.S. PATENT DOCUMENTS

| 5,511,128 | A | * | 4/1996 | Lindemann | ......... H04R 25/552 |
| | | | | | 381/356 |
| 5,740,256 | A | * | 4/1998 | Castello Da Costa | ...................... |
| | | | | | H04B 7/015 |
| | | | | | 381/94.7 |
| 6,154,552 | A | * | 11/2000 | Koroljow | .............. G01S 3/8006 |
| | | | | | 367/119 |
| 7,359,838 | B2 | | 4/2008 | Marro et al. | |

(Continued)

FOREIGN PATENT DOCUMENTS

WO 2016093834 A1 6/2016

OTHER PUBLICATIONS

Schwarz et al., "Unbiased Coherent-to-Diffuse Ratio Estimation for Dereverberation," Sep. 2014.

(Continued)

*Primary Examiner* — Shaun Roberts
(74) *Attorney, Agent, or Firm* — Brian J. Colandreo; Michael T. Abramson; Holland & Knight LLP (57) ABSTRACT

Embodiments of the present disclosure may include a system and method for speech enhancement using the coherent to diffuse sound ratio. Embodiments may include receiving an audio signal at one or more microphones and controlling one or more adaptive filters of a beamformer using a coherent to diffuse ratio ("CDR").

22 Claims, 9 Drawing Sheets

(56) References Cited

U.S. PATENT DOCUMENTS

| | | | |
|---|---|---|---|
| 7,747,001 B2* | 6/2010 | Kellermann | H04M 9/082 |
| | | | 379/406.01 |
| 8,363,850 B2 | 1/2013 | Amada | |
| 2003/0147538 A1* | 8/2003 | Elko | H04R 3/005 |
| | | | 381/92 |
| 2004/0071284 A1* | 4/2004 | Abutalebi | G10L 21/0208 |
| | | | 379/406.08 |
| 2005/0147258 A1* | 7/2005 | Myllyla | H01Q 3/2611 |
| | | | 381/71.11 |
| 2009/0055170 A1* | 2/2009 | Nagahama | G10L 15/20 |
| | | | 704/226 |
| 2009/0304200 A1* | 12/2009 | Kim | G10K 11/178 |
| | | | 38/71.11 |
| 2011/0255702 A1 | 10/2011 | Jensen | |
| 2014/0177857 A1* | 6/2014 | Kuster | H04R 25/407 |
| | | | 381/66 |
| 2014/0337016 A1 | 11/2014 | Herbig et al. | |

OTHER PUBLICATIONS

Extended European Search Report issued in EP Application Serial No. 14907765.3 dated Apr. 3, 2018.
International Search Report issued in PCT Application Serial No. PCT/US2014/069943 dated Mar. 17, 2015.

* cited by examiner

SYSTEM AND METHOD FOR SPEECH ENHANCEMENT USING A COHERENT TO DIFFUSE SOUND RATIO

CROSS-REFERENCE TO RELATED APPLICATION

This application is a U.S. National Stage of International Patent Application No. PCT/US2014/069943, filed on 12 Dec. 2014. The disclosure of which is incorporated herein by reference in its entirety.

TECHNICAL FIELD

This disclosure relates to signal processing and, more particularly, to a method for speech enhancement using a coherent-to-diffuse sound ratio ("CDR").

BACKGROUND

Current solutions for beamforming and spatial filtering work best for static geometrical arrangements in which the speaker's position doesn't move much relative to the position of the microphones. Adaptive filters can track the speaker but they need time to converge. Accordingly, during the time directly after movements of the speaker or of the device performance may be degraded.

Another class of systems tries to estimate the ratio of coherent sound energy (generally as desired component) and diffuse sound energy (generally interference). The CDR may be used directly to calculate a filter for noise reduction.

SUMMARY OF DISCLOSURE

In one implementation, a method, in accordance with this disclosure, may include receiving an audio signal at one or more microphones. The method may include controlling one or more adaptive filters of a beamformer using a coherent to diffuse ratio ("CDR").

One or more of the following features may be included. In some embodiments, the CDR may be estimated and mapped to a control variable. The CDR may be combined with at least one of a signal to noise ratio ("SNR") and a signal power ratio ("SPR"). In some embodiments, controlling may occur in a generalized sidelobe canceller ("GSC") type beamformer. The method may include controlling at least one of a blocking filter and an update associated with an interference canceller filter. The CDR may be configured to suppress late reverberation prior to direction of arrival ("DOA") estimation. The CDR may be used as a spectral weight in a generalized cross correlation. The CDR may be used to detect at least one signal component for T-60 estimation. The method may include estimating a power spectral density associated with post-beamforming noise or a microphone signal used in a spatial postfilter. The method may include generating a CDR-based overestimation factor for a noise power spectral density. In some embodiments, estimating may include suppressing a coherent sound part in the power spectral density using a spectral CDR that refers to an output of a blocking matrix or an error of a blocking filter.

In another implementation, a system is provided. The system may include one or more processors and one or more microphones configured to receive an audio signal, the one or more processors configured to control one or more adaptive filters of a beamformer using a coherent to diffuse ratio ("CDR").

One or more of the following features may be included. In some embodiments, the CDR may be estimated and mapped to a control variable. The CDR may be combined with at least one of a signal to noise ratio ("SNR") and a signal power ratio ("SPR"). In some embodiments, controlling may occur in a generalized sidelobe canceller ("GSC") type beamformer. The one or more processors may be configured to control at least one of a blocking filter and an update associated with an interference canceller filter. The CDR may be configured to suppress late reverberation prior to direction of arrival ("DOA") estimation. The CDR may be used as a spectral weight in a generalized cross correlation. The CDR may be used to detect at least one signal component for T-60 estimation. The one or more processors may be configured to estimate a power spectral density associated with post-beamforming noise or a microphone signal used in a spatial postfilter The one or more processors may be configured to generate a CDR-based overestimation factor for a noise power spectral density. In some embodiments, estimating may include suppressing a coherent sound part in the power spectral density using a spectral CDR that refers to an output of a blocking matrix or an error of a blocking filter.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards a speech enhancement method that is based upon the coherent to diffuse sound ratio ("CDR"). Existing approaches utilize the technique of spatial post filtering. So far, however, this technique relies on a converged blocking filter. Other approaches use the CDR to directly filter one of the microphone signals and are not very flexible (e.g., to be coupled with other information such as SNR or other signal detectors).

Accordingly, embodiments of CDR process 10 described herein may use the CDR mainly for control purposes rather than for a direct application in the postfilter. The CDR helps to control the adaptive filters of a beamformer (and may replace acoustic speaker localization). At the same time the CDR may be used to overcome the problems of a non-converged filter.

Figure 1:
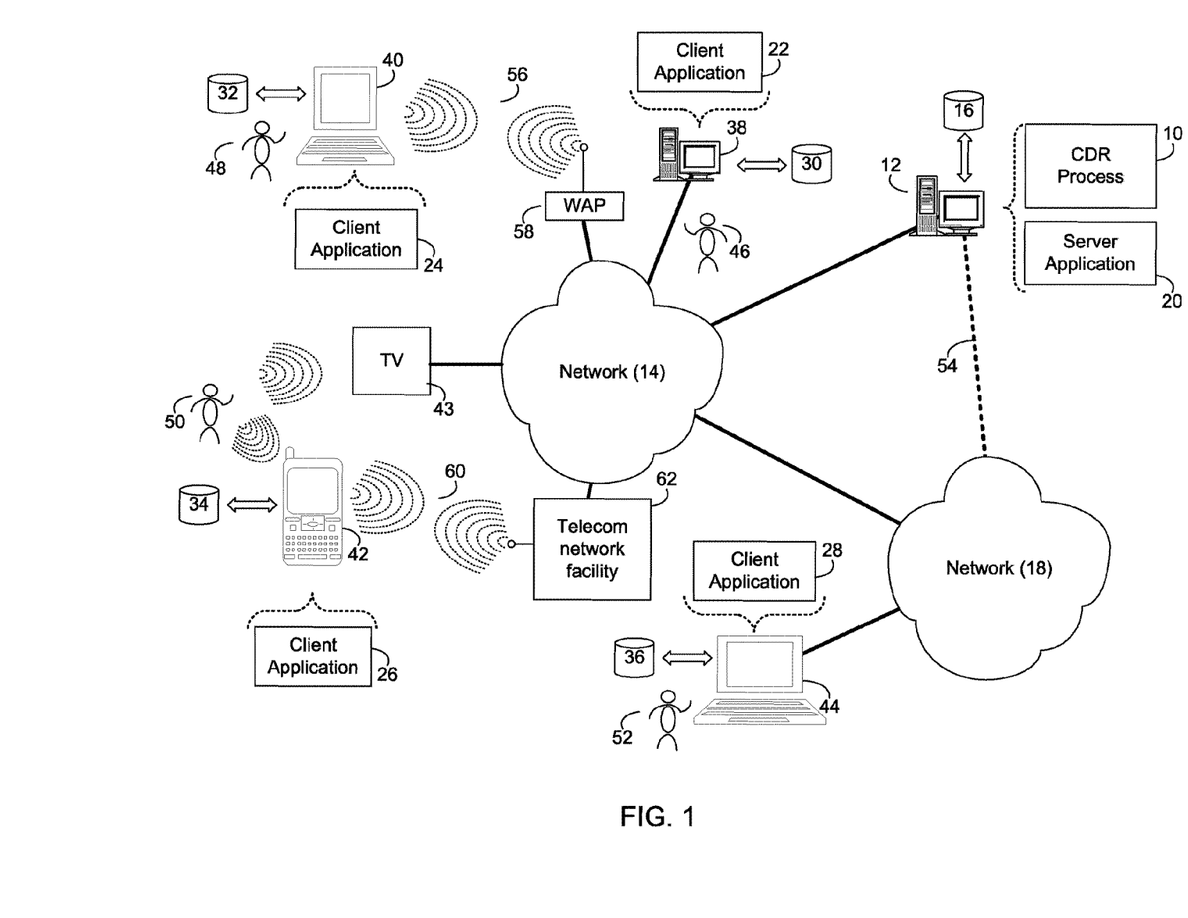
FIG. 1 is a diagrammatic view of a CDR process in accordance with an embodiment of the present disclosure.
Figure 2:
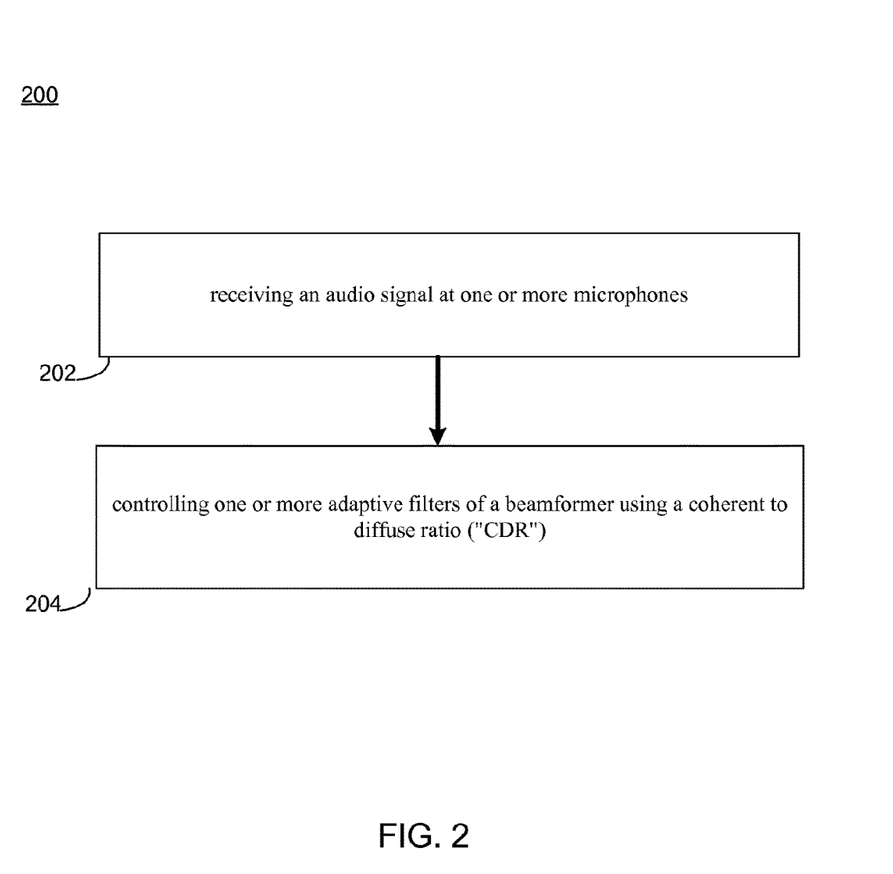
FIG. 2 is a flowchart of a CDR process in accordance with an embodiment of the present disclosure.

Referring to FIG. 1, there is shown an CDR process 10 that may reside on and may be executed by any of the devices shown in FIG. 1, for example, computer 12, which may be connected to network 14 (e.g., the Internet or a local area network). Server application 20 may include some or all of the elements of CDR process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-9, CDR process 10 may include receiving (202) an audio signal at one or more microphones (it should be noted that many of the examples described herein operate on two or more microphones) and controlling (204) one or more adaptive filters of a beamformer using a coherent to diffuse ratio ("CDR").

The instruction sets and subroutines of CDR process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, CDR process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of CDR process 10. Accordingly, CDR process 10 may be a purely server-side application, a purely client-side application, or a hybrid server-side/client-side application that is cooperatively executed by one or more of client applications 22, 24, 26, 28 and CDR process 10.

Client electronic devices 38, 40, 42, 43, 44 may each execute an operating system, examples of which may include but are not limited to Apple iOS™, Microsoft Windows™, Android™, Redhat Linux™, or a custom operating system. Each of client electronic devices 38, 40, 42, 43, and 44 may include one or more microphones and/or speakers configured to implement CDR process 10 as is discussed in further detail below.

Users 46, 48, 50, 52 may access computer 12 and CDR process 10 directly through network 14 or through secondary network 18. Further, computer 12 may be connected to network 14 through secondary network 18, as illustrated with phantom link line 54. In some embodiments, users may access CDR process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 (or television remote control, etc.) and server computing device 12. Embodiments of CDR process 10 may be used with any or all of the devices described herein as well as many others.

Figure 3:
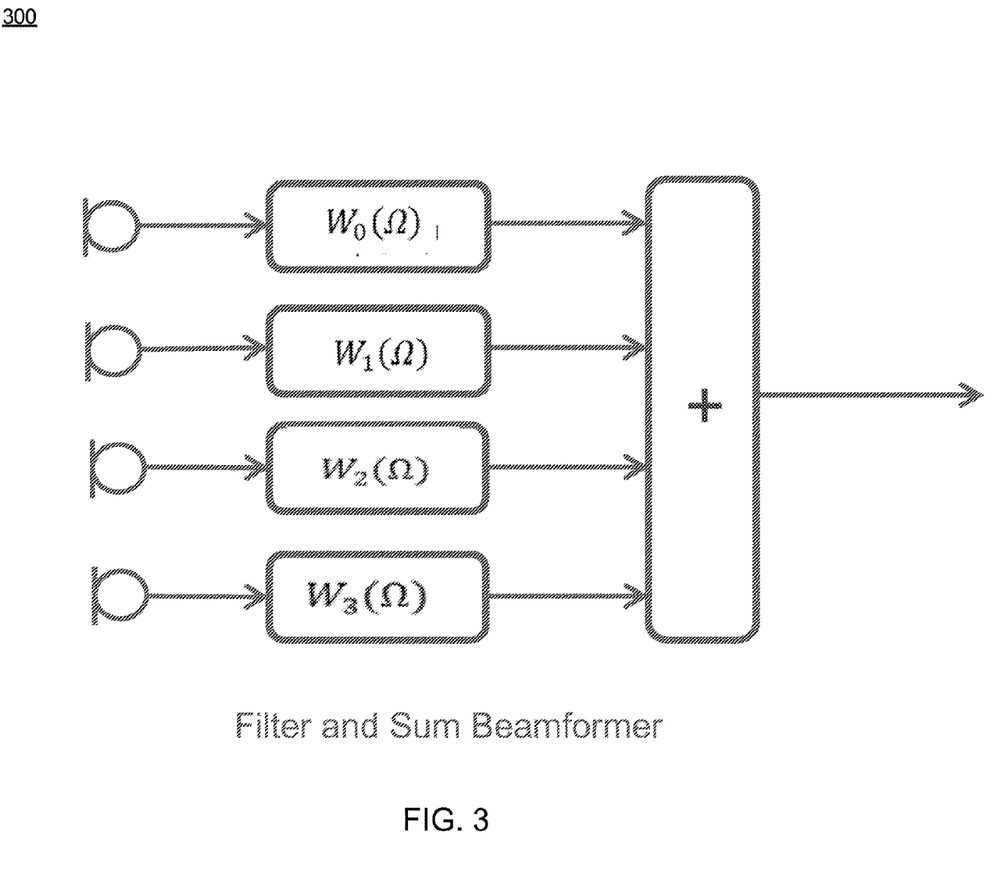
FIG. 3 is a diagrammatic view of a beamformer in accordance with an embodiment of the present disclosure.
Figure 4:
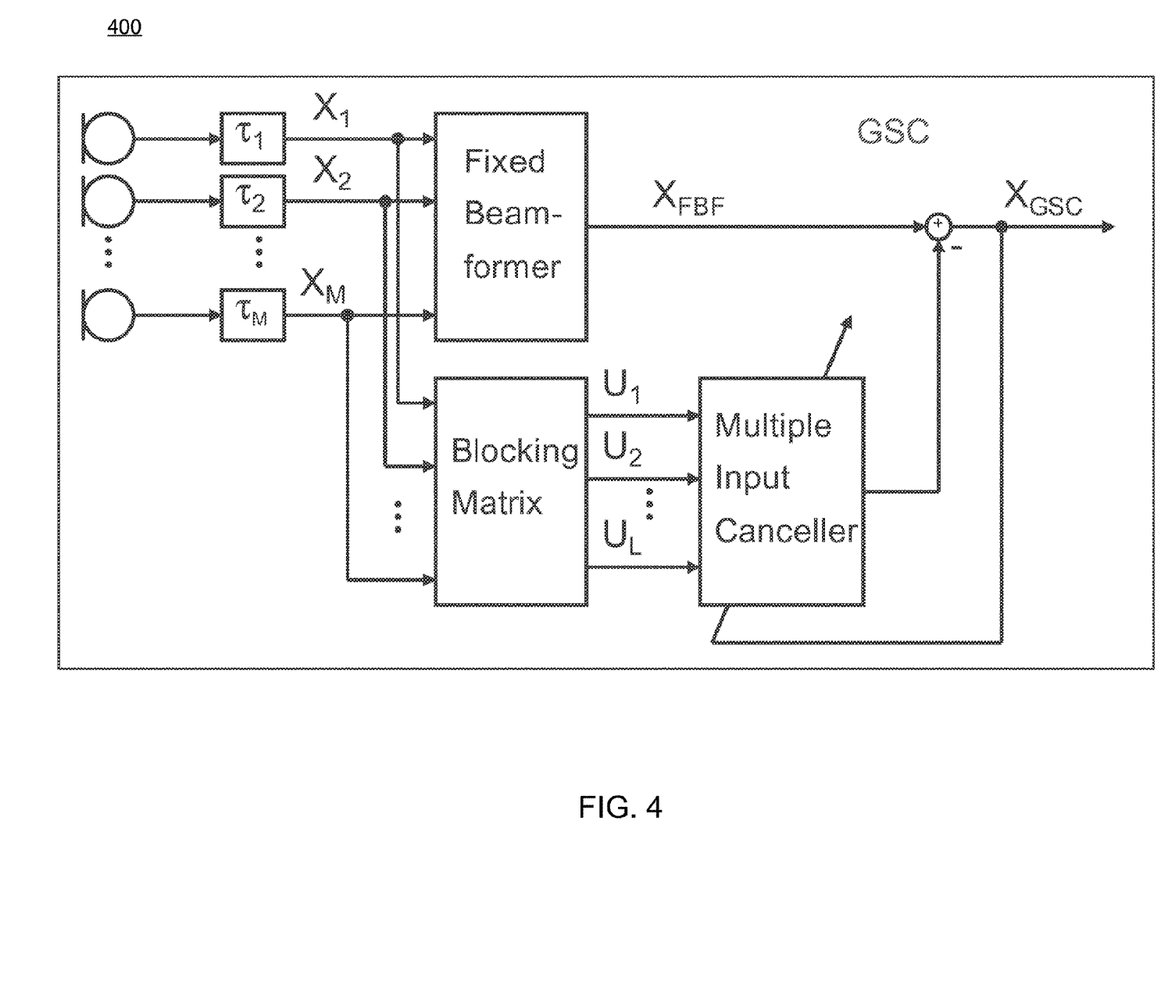
FIG. 4 is a diagrammatic view of a system in accordance with an embodiment of the present disclosure.
Figure 5:
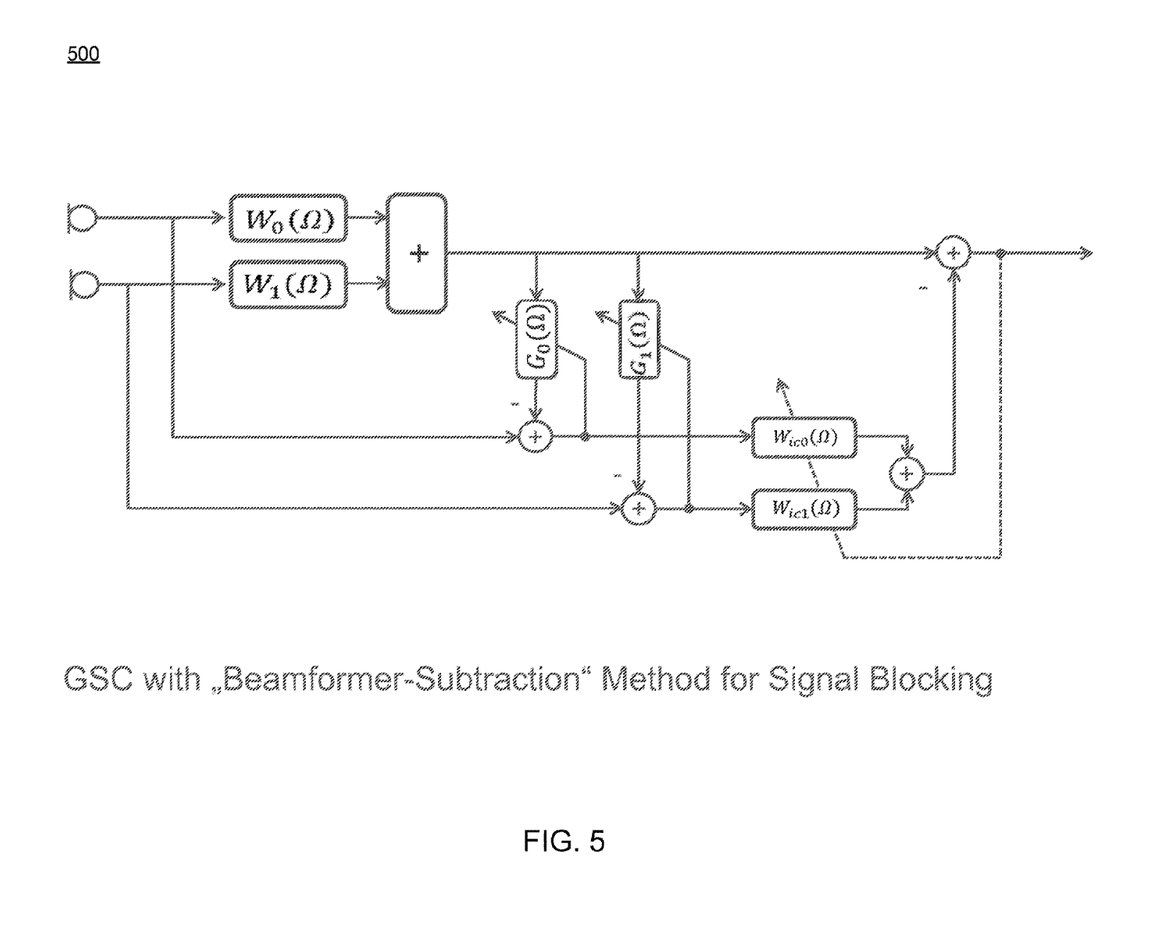
FIG. 5 is a diagrammatic view of a system configured to implement a CDR process in accordance with an embodiment of the present disclosure.
Figure 6:
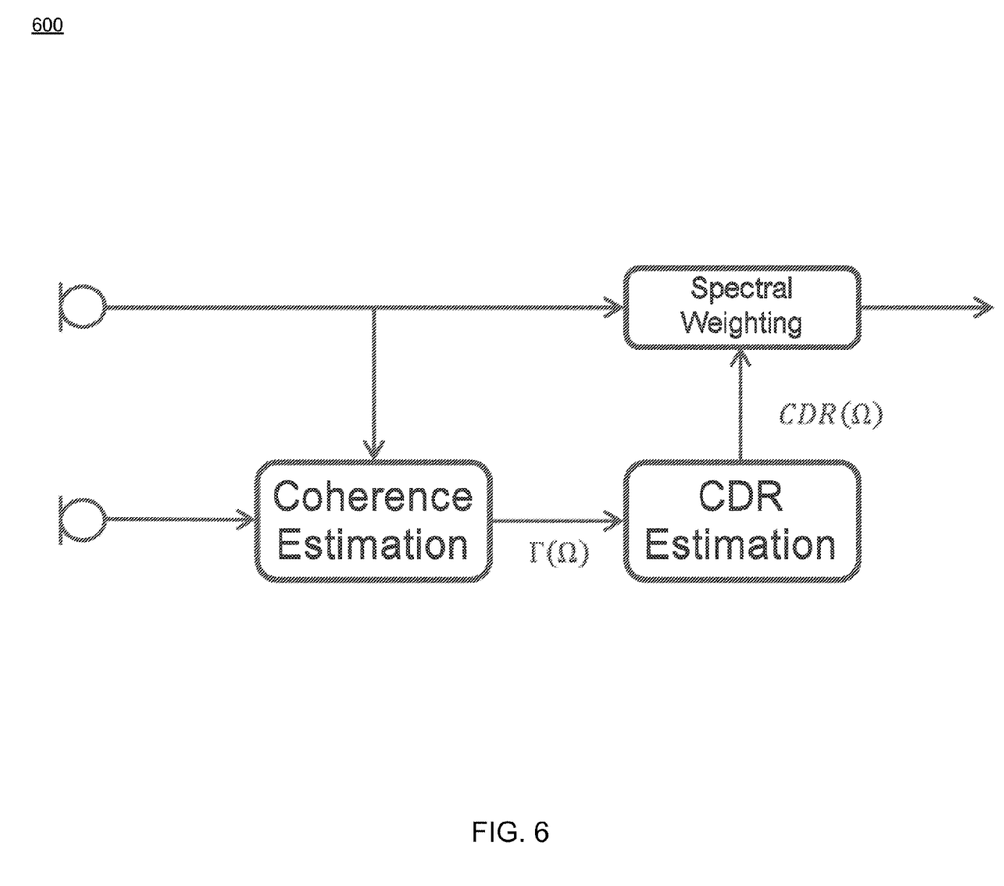
FIG. 6 is a diagrammatic view of a system configured to implement a speech enhancement process.

Referring now to FIGS. 3-5, embodiments of CDR process 10 depicting various beamforming examples are provided. Beamforming, as used herein, may generally refer to a signal processing technique used in sensor arrays for directional signal transmission or reception. Beamforming methods may be used for background noise reduction, particularly in the field of vehicular handsfree systems, but also in other applications. A beamformer may be configured to process signals emanating from a microphone array to obtain a combined signal in such a way that signal components coming from a direction different from a predetermined wanted signal direction are suppressed. Microphone arrays, unlike conventional directional microphones, may be electronically steerable which gives them the ability to acquire a high-quality signal or signals from a desired direction or directions while attenuating off-axis noise or interference. It should be noted that the discussion of beamforming is provided merely by way of example as the teachings of the present disclosure may be used with any suitable signal processing method.

Beamforming, therefore, may provide a specific directivity pattern for a microphone array. In the case of, for example, delay-and-sum beamforming (DSBF), beamforming encompasses delay compensation and summing of the signals. Due to spatial filtering obtained by a microphone array with a corresponding beamformer, it is often possible to improve the signal to noise ratio ("SNR"). However, achieving a significant improvement in SNR with simple DSBF requires an impractical number of microphones, even under idealized noise conditions. Another beamformer type is the adaptive beamformer. Traditional adaptive beamformers optimize a set of channel filters under some set of constraints. These techniques do well in narrowband, far-field applications and where the signal of interest generally has stationary statistics. However, traditional adaptive beamformers are not necessarily as well suited for use in speech applications where, for example, the signal of interest has a wide bandwidth, the signal of interest is non-stationary, interfering signals also have a wide bandwidth, interfering signals may be spatially distributed, or interfering signals are non-stationary. A particular adaptive array is the generalized sidelobe canceller (GSC). The GSC uses an adaptive array structure to measure a noise-only signal which is then canceled from the beamformer output. However, obtaining a noise measurement that is free from signal leakage, especially in reverberant environments, is generally where the difficulty lies in implementing a robust and effective GSC. An example of a beamformer with a GSC structure is described in L. J. Griffiths & C. W. Jim, An Alternative Approach to Linearly Constrained Adaptive Beamforming, in IEEE Transactions on Antennas and Propagation, 1982 pp. 27-34.

In multichannel speech enhancement it is an essential task to separate the diffuse and coherent sound components. Estimates of the power ratio between coherent and diffuse sounds can help to improve the performance of state of the art speech enhancement algorithms.

Multi-microphone signal processing exploits the spatial properties of the sound field. The microphone signals represent spatial samples of the acoustic sound pressure. In the case of a single sound source (e.g., without any background noise) the microphone signals are highly correlated. In the case of many independent sound sources the sound field is diffuse (isotropic). There is no pre-dominant direction in the sound field. A diffuse sound field can occur when there are many sound sources (e.g., in a car noise comes in from all directions) or if there are a lot of sound reflections from different boundaries in a room (e.g., late reverberation is assumed to be diffuse). The coherence is a normalized spectral measure for the correlation of the sound field:

$$\Gamma_{x_1 x_2}(e^{j\Omega\mu}) = \frac{s_{x_1 x_2}(e^{j\Omega\mu})}{\sqrt{s_{x_1 x_1}(e^{j\Omega\mu}) \cdot s_{x_2 x_2}(e^{j\Omega\mu})}} \quad (1.1)$$

Here, $S_{x_1 x_2}(e^{j\Omega\mu})$ denotes the cross power-spectral-density (PSD) of the microphone signals $X_1$ and $X_2$. By definition, the cross-PSD is the fourier transform of the cross-correlation (see Wiener-Khintchine Theorem). The correlation is a measure for linear dependencies and so is its spectral counterpart (the coherence $\Gamma_{x_1 x_2}(e^{j\Omega\mu})$). The signals received from a point source are linearly dependent because $X_1$ and $X_2$ are both linearly filtered versions of the source signal (filtered by the acoustic paths from the source to each microphone). Hence, there is a linear dependency between both and consequently the coherency has a magnitude of close to 1 for sounds from a point source.

Alternatively, sound fields generated by non-point sources may have 0 coherence or take the form of a sinc-function if the sound field is exactly diffuse. In real-world situations there is always a superposition of different sound fields. Therefore, the superposition of a coherent and a diffuse sound field results in a value for the coherence which is between the two extreme cases (i.e., coherent and diffuse).

The CDR determines the ratio of the coherent sound energy to the diffuse sound energy:

$$CDR(e^{j\Omega\mu}) = \frac{\phi_{xx}^c(e^{j\Omega\mu})}{\phi_{xx}^\odot(e^{j\Omega\mu})}. \quad (1.2)$$

It can be expressed as a function of the signal and noise coherence functions:

$$CDR(e^{j\Omega\mu}) = \frac{\Gamma_n(e^{j\Omega\mu}) - \Gamma_x(e^{j\Omega\mu})}{\Gamma_x(e^{j\Omega\mu}) - \Gamma_s(e^{j\Omega\mu})}, \quad (1.3)$$

where $\Gamma_n(e^{j\Omega\mu})$ is the noise coherence, $\Gamma_s(e^{j\Omega\mu})$ is the coherence of the signal (without the noise) and $\Gamma_x(e^{j\Omega\mu})$ denotes the coherence of the noisy signal (observable). The broadband CDR may be obtained by averaging CDR ($e^{j\Omega\mu}$) along frequency. High CDR-values indicate activity of a localizable signal source. Low values indicate that the sound field is dominated by diffuse sounds. This is the case for diffuse background noise (in the absence of any coherent or localizable sound source) or for reverberation after activity of any non-stationary signal activity.

Signal processing techniques such as beamforming may rely on the prior knowledge of the direction of arrival ("DOA") of a sound source. If this information is available the beam can be steered towards this direction to capture sounds from this particular direction and suppress others (given the array geometry is known as well). The DOA estimation is a technique that seeks to extract information about coherent sounds, as there is no such DOA for diffuse sounds.

One method to estimate the DOA is the generalized cross correlation ("GCC"). Here, the cross correlation between at least two microphone signals is measured as a function of the time-lag τ:

$$r_{x1x2}(\tau) = \frac{2}{N_{DFT}} Re\left\{\sum_{\mu=0}^{N_{DFT}/2-1} G(e^{j\Omega\mu}) \cdot S_{x1x2}(e^{j\Omega\mu}) \exp(j\Omega_\mu f_a \tau)\right\} \quad (1.4)$$

The time lag between the observed signals may then be mapped to a spatial angle, based on the (known) array geometry. If there is no time lag at all, it can be concluded that the signals impinge from the broadside of the microphone array, whereas the maximum time-lag may be obtained if the signals arrive from the so-called endfire direction (perpendicular to the array broadside).

In some embodiments, the GCC function may include a filter $G(e^{j\Omega\mu})$ which can be used to control the characteristics of the resulting DOA estimator.

Beamforming assumes the knowledge of a steering direction or a desired source. The signals from this direction or sound source, respectively are transmitted with little or no distortion. Sounds coming from other directions are suppressed by the beamforming.

It is common to have first a time delay compensation ("TDC") stage that simply delays each microphone signal with an individual delay value. After the TDC stage the signal components coming from the desired direction are in phase and can therefore be summed up constructively. Signals from other directions show some destructive interference when summing up. The beamforming operation can be described as a scalar product between the signal vector $\underline{X}(e^{j\Omega\mu})=(X_0(e^{j\Omega\mu})), \ldots, X_{M-1}(e^{j\Omega\mu}))^T$ and the vector of beamformer filters $\underline{W}(e^{j\Omega\mu})=(W_0(e^{j\Omega\mu})), \ldots, W_{M-1}(e^{j\Omega\mu}))^T$:

$$A(e^{j\Omega\mu})=\underline{W}^H(e^{j\Omega\mu})\underline{X}(e^{j\Omega\mu}). \quad (1.5)$$

The time delay compensation may or may not be thought of as a part of the filters in $\underline{W}(e^{j\Omega\mu})$. However, it is possible to split $\underline{W}(e^{j\Omega\mu})$ into the delay compensation filters and the actual filters used for the filter-and-sum beamforming operation.

Practically, it is desired to use a beamformer according to the minimum variance distortionless response ("MVDR") design but implement it such that it adapts automatically to the present noise field rather than an assumed field (using a model for the noise coherence $\Gamma_n(e^{j\Omega\mu})$). An efficient adaptive implementation can be achieved by using a Generalized Sidelobe Canceller Structure (GSC-Structure) as it is depicted in FIG. 4.

The GSC structure includes a matrix $B(e^{j\Omega\mu})$ that rejects all signals that are not to be distorted by the overall beamformer (e.g., desired signals that are protected by the constraint). Therefore, it is often referred to as a "blocking matrix." Ideally, the signals at the output of the blocking matrix are free of the desired signal components—hence contain only some filtered noise. These noise reference signals are then used to carry out the minimization of the output power. The latter is done by the interference canceller filters.

To further improve the SNR at the output of a beamformer one or more postfilters may be employed. In principle, a postfilter is a noise reduction filter. Any noise reduction filter based on spectral enhancement may require a PSD representing the interfering signal components to be suppressed. In the case of a spatial postfilter this PSD has a blocking matrix as spatial preprocessor. There are different ways of generating such a PSD, one of them being:

$$\Phi_{zz}(e^{j\Omega\mu}) = \quad (1.6)$$
$$tr\{B(e^{j\Omega\mu})\Phi_{xx}(e^{j\Omega\mu})B^H(e^{j\Omega\mu})\} \cdot \frac{\underline{W}^H(e^{j\Omega\mu})J_{vv}\underline{W}(e^{j\Omega\mu})}{tr\{B(e^{j\Omega\mu})J_{vv}(e^{j\Omega\mu})B^H(e^{j\Omega\mu})\}}.$$

On the right side of this equation the first trace is equivalent to the summed PSD after the blocking matrix, whereas the fraction on the very right is an equalization that corrects for the bias depending on the coherence matrix $J_{vv}(e^{j\Omega\mu})$ of the noise. It can either be estimated online or computed based on an assumed noise coherence. For further details on spatial postfiltering please refer to Wolff and M.

Buck: A generalized view on spatial postfilters: In: Proc. International Workshop on Acoustic Signal Enhancement. Tel Aviv, Israel, 2010.

In the present context, the important property of $\Phi_{zz}(e^{j\Omega\mu})$ is that it does not contain the coherent parts of the desired signal because they have been removed by the blocking matrix. The only component of the desired speech present in this PSD is the late reverberation which is why the spatial postfilter acts as a de-reverberation filter (desired positive effect).

The late reverberation that is present in large rooms is often modeled to decay exponentially. The time it takes to decay by 60 dB after the source signal has vanished is called the $T_{60}$. The $T_{60}$ is typically in the range of 50 ms for a rather dry car cabin and can take values of some seconds for a church for instance. Several methods for its estimation have been proposed. See, e.g., N. D. Gaubitch, H. W. Ullmann, M. Jeub, T. H. Falk, P. A. Naylor, P. Vary, and M. Brookes. Performance comparison of algorithms for blind reverberation time estimation for speech. In Proceedings of International Workshop on Acoustics Signal Enhancement, Aachen, Germany, 2012.

These $T_{60}$ estimators commonly rely on a detection mechanism for the exponential decay periods in the signal.

The technologies outlined in the previous section have in common that they focus on either coherent or diffuse sounds. In the case of DOA estimation, the algorithm should ideally focus on coherent parts only as there is no such DOA for diffuse sounds. As a consequence, diffuse sounds interfere with the DOA estimation algorithm and degrade its performance. DOA estimation algorithms may work best in non-reverberant environments.

Adaptive beamformers are practically implemented using adaptive filters for the signal blocking (adaptive blocking matrix). Thereby, a more robust performance with respect to distortions of the desired signal can be achieved. These adaptive filters must be controlled such that they match the desired signal components, which are coherent sounds (e.g., from the beamformer steering direction). If the beamforming is used in reverberant environments the diffuse late reverberation acts as interference with respect to the control of the blocking filters.

If the beamformer is extended by a spatial postfilter, the overall system relies even more on blocking filters that are well matched to coherent sound components from the steering direction. The blocking filters are beneficial as their filter length can be chosen to block signals in a time window (e.g., 50 m). Reflections outside this window may not be blocked and hence suppressed by the spatial postfilter as these components are part of the noise PSD. For a well converged blocking matrix a good speech quality is achieved. However, this advantage comes at the expense of a possibly not well converged system. As a consequence, signal distortions may occur. This may be the case when the acoustic environment changes or the steering direction of the beam changes at runtime. It should be noted here, that the signal components that leak into the noise PSD estimate and cause these undesired distortions are coherent sound components.

In a $T_{60}$ estimation the problem is to tell decaying signal components from decaying reverberation components. This may be due to the lack of a separating signal trait. Therefore, the $T_{60}$ estimators are likely to confuse decaying parts of the desired signal with decay that correspond to the decay of the late reverberation. The signal components, however, can be considered to be coherent (early parts) whereas the reverberation is often modeled as diffuse.

Figure 7:
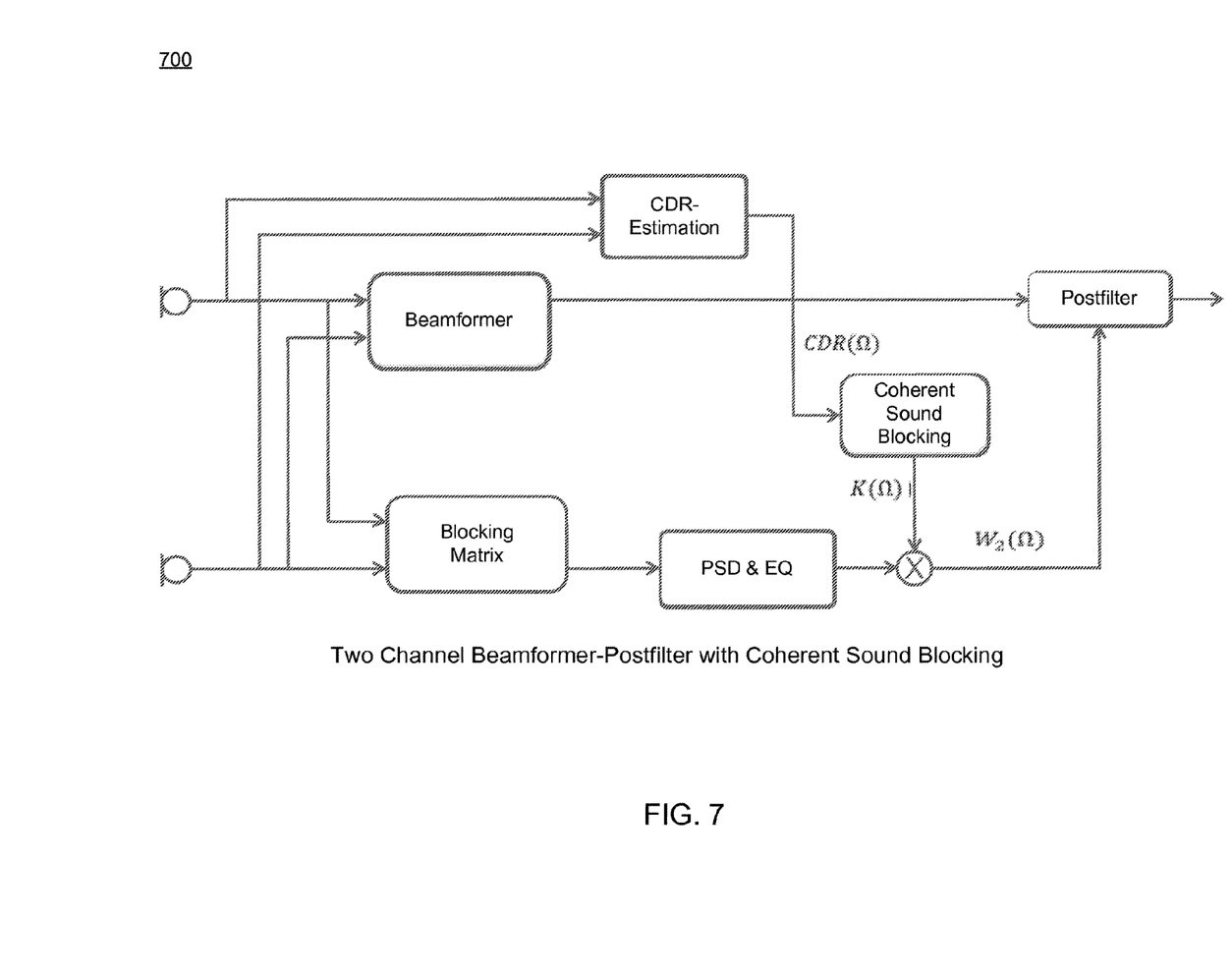
FIG. 7 is a diagrammatic view of a system configured to implement a CDR process in accordance with an embodiment of the present disclosure.
Figure 8:
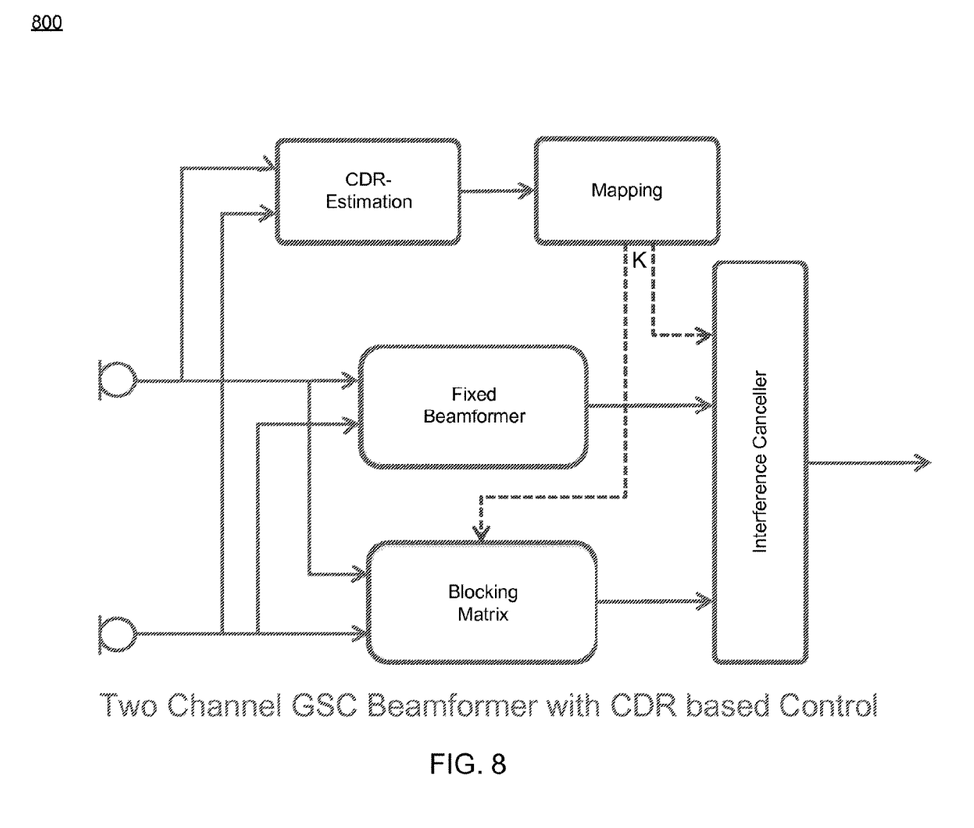
FIG. 8 is a diagrammatic view of a system configured to implement a CDR process in accordance with an embodiment of the present disclosure.

Referring now to FIGS. 7-8, diagrams consistent with embodiments of CDR process 10 are provided. Embodiments of CDR process 10 may include one or more beamformers, which may include an adaptive signal blocking stage (e.g., adapted during speech activity) and an adaptive interference cancellation stage (e.g., adapted during speech pauses). Existing techniques for controlling the adaptation of the filters utilize directional information to decide on speech or speech pause. In this way, the position of the speaker has had to be known (either a fixed direction or the result of ASL).

In contrast, embodiments of CDR process 10 may use the CDR measure to control the adaptations. The adaptive signal blocking filters may be adapted for high CDR values and the adaptive interference cancellation filters (see, e.g., FIG. 8) may be adapted during low values of the CDR.

Embodiments of CDR process 10 may include one or more spatial postfilters as shown in FIG. 7. For spatial post filtering the output signal of the adaptive signal blocking stage may be used to derive an estimate for the power spectral density ("PSD") of the remaining noise after beam forming. This spatial noise PSD may be used together with the PSD of the adaptive beam former to calculate spectral weighting factors (see, e.g., FIG. 6) that may be applied to the output signal of the adaptive beam former. Non-converged blocking filters lead to leakage of the desired signal into the spatial noise PSD and therefore to speech distortions in the spatial post filter. In order to keep out speech components of the spatial noise PSD, embodiments of CDR process 10 may introduce the concept of "coherent-sound blocking". When the CDR shows high values the spatial noise PSD may be strongly underestimated (e.g., the leakage of any coherent sound into the spatial noise PSD is blocked). This leads to less speech distortion for the critical case of non-converged blocking filters.

Embodiments of CDR process 10 may use the CDR as a control measure. In existing techniques, the CDR has been used as a single measure. It has not been combined with other signal detectors. In contrast, embodiments of CDR process 10 may use CDR as a control measure for filter adaptation and sound blocking (i.e., rather than directly for noise reduction). Additionally and/or alternatively, it may be combined with other signal detectors. For example, it may be combined with the SNR or with power ratios between two microphones or with estimates of the direction of arrival.

Embodiments of CDR process 10 may use the CDR to control one or more technologies in order to improve their performance in acoustic scenarios where both diffuse and coherent sounds are present.

Generally, the spectral CDR can be fused with other sources if information such as the spectral SNR, Signal Power Ratios ("SPR"), Pitch frequency estimators or even signals from external sensors. External sensors may provide information about the harmonics of a car engine, presence of wind noises, about whether a mobile phone is held at the ear or not (e.g., proximity sensor). Also, external information may be the orientation of a mobile device, or even GPS information. In the case of mobile devices (e.g., smart phones etc.) especially the ratio between the powers of the microphone signals carries useable information. To be explicit, a general mapping a $\mathfrak{F}\{\cdot\}$ is considered that maps these input features in the desired way to the desired range:

$$K(e^{j\Omega\mu})=\mathfrak{F}\{CDR(e^{j\Omega\mu}),SNR(e^{j\Omega\mu}),\Psi(e^{j\Omega\mu})\}. \quad (2.1)$$

Here, $\Psi(e^{j\Omega\mu})$ represents any possible source of information. The other features can in principle be combined with the CDR in any way (e.g. averaging, linear combinations, non-linear combinations such as p-norm, MIN-MAX operations, etc.).

In some embodiments, the update rule for adaptive filters usually includes a stepsize to scale the effect of the update. In this way, the algorithm can be controlled to adapt only to those signal components that are helpful in terms of minimizing the respective cost-function. For example, it is common to slow down the update of an NLMS adaptive filter in the presence of noise. In the present context $\mathfrak{F}\{\cdot\}$ can be chosen such that $K(e^{j\Omega\mu})$ becomes a CDR dependent stepsize $\in[0\ 1]$ for the adaptive filters in a blocking matrix. As a simple example, $\mathfrak{F}\{\cdot\}$ may for instance be chosen as linear mapping:

$$K(e^{j\Omega\mu})=\text{MAX}(\text{MIN}(m\cdot CDR(e^{j\Omega\mu})+b,1),0). \quad (2.2)$$

$K(e^{j\Omega\mu})$ can then be used as a stepsize for an adaptive filter. The slope m and the translation b can be chosen as desired. This way, however, the blocking filters may be adapted to coherent sounds only which is desired for adaptive beamforming.

Embodiments of CDR process 10 may be used in a variety of different scenarios and configurations (e.g., not only the blocking filters can be adapted based on the CDR). Accordingly, CDR process 10 may also be used to adapt the interference canceller filters. In some embodiments, the beamformer can be used as a multichannel dereverberation system. In this case, the blocking filters must still reject the early parts of the speech signal (as usual), but the interference canceller filters should minimize the energy of the late reverberation. For this to work, the first L taps of the IC-filters should actually be zero (introduces delay at the length L of the blocking filters) and the taps greater than L must be controlled such that the filters are only updated with respect to the late reverb. Accordingly, a CDR-based stepsize can be used. In this application the IC-filters should be chosen rather large (~500 ms).

As mentioned above, the spatially preprocessed noise PSD used for spatial postfiltering may contain coherent sounds that leak through the blocking matrix if its not yet fully converged. In this case signal distortions will occur. Embodiments of CDR process 10 may use the spectral CDR to compute a weight $K(e^{j\Omega\mu})$ such that:

$$\phi_{uu}(e^{j\Omega\mu})\cdot K(e^{j\Omega\mu})=\phi_{uu}^{\odot}(e^{j\Omega\mu}). \quad (2.3)$$

Here, $\phi_{uu}(e^{j\Omega\mu})=\text{tr}\{B_n(e^{j\Omega\mu})\phi_{xx}(e^{j\Omega\mu})B_n^H(e^{j\Omega\mu})\}$ is the summed PSD after the blocking matrix (average would work as well). The term $\phi_{uu}^{\odot}(e^{j\Omega\mu})$ on the right denotes the diffuse part of $\phi_{uu}(e^{j\Omega\mu})$. In total $\phi_{uu}(e^{j\Omega\mu})$ is modeled to be composed of coherent and diffuse parts:

$$\phi_{uu}(e^{j\Omega\mu})=\phi_{uu}^{c}(e^{j\Omega\mu})+\phi_{uu}^{\odot}(e^{j\Omega\mu}). \quad (2.4)$$

Solving for $K(e^{j\Omega\mu})$ leads to:

$$K(e^{j\Omega\mu}) = \frac{1}{1 + \frac{\phi_{uu}^c(e^{j\Omega\mu})}{\phi_{uu}^{\odot}(e^{j\Omega\mu})}}. \quad (2.5)$$

Here, the fraction in the denominator is now estimated using one of the existing CDR estimators:

$$K(e^{j\Omega\mu}) = \frac{1}{1 + CDR(e^{j\Omega\mu})}. \quad (2.6)$$

The resulting filter $K(e^{j\Omega\mu})$ now has the effect of suppressing the coherent sounds in the noise PSD estimate used in the spatial postfilter. As the CDR-estimate is independent of the blocking filters and their convergence state, the coherent sound blocking will reduce the risk of speech distortion.

Depending on what kind of beamformer is used, the CDR-estimate has to be chosen. Generally, the CDR-estimate should be steered into the same direction as the beamformer, otherwise the spatial postfilter would lose its spatial filtering property. However, if a beamformer is used that adjusts its steering direction on its own (e.g., a self-steering beamformer) an omni-directional CDR estimator should be used. Note, that the coherent sound blocking preserves the de-reverberating effect of the spatial postfilter. This is because the (diffuse) reverb will not be touched by the coherent sound blocking and thus remains in the noise PSD used in the postfilter.

As has already been mentioned above, the noise PSD estimate is the most crucial part in a noise reduction filter. It is common to weight the respective estimate with an over estimation factor beta to decrease noise reduction artifacts. This, however comes at the expense of an increased signal distortion risk. Here, the CDR could also be used to make the noise reduction filter less aggressive in the presence of coherent sounds, whereas a larger overestimation can be used during diffuse sounds only. Again, various mappings $\mathfrak{F}$ :CDR$\mapsto$ β can be designed.

Known $T_{60}$ estimators operate in the time domain. To detect whether a signal segment with decaying amplitudes belongs to reverberation the broadband CDR can be used. Only of the CDR is found to be low enough the $T_{60}$ should be updated. Thereby, decaying segments of coherent parts can be excluded from the chosen estimator.

To increase the robustness of DOA estimators, the signals can generally be pre-filtered to suppress reverberation. This can be done by applying a noise reduction filter that uses the CDR $(e^{j\Omega\mu})$ instead of the CDR $(e^{j\Omega\mu})$. However, in the case of the GCC, the filter $G(e^{j\Omega\mu})$ may be chosen as $G(e^{j\Omega\mu})=\text{CDR}(e^{j\Omega\mu})$. Also, some mapping $\mathfrak{F}\{\text{cDR}(e^{j\Omega\mu})\}$ may be employed too.

In some embodiments, the postfilter and beamformer may be arranged in any suitable configuration. For example, the postfilter may be placed behind the beamformer, with no beamformer in between, etc. In some embodiments, there may be a spatial filter, hence a filter with a blocking matrix as a spatial preprocessor in front of the noise PSD estimation. The Term $\underline{W}^H(e^{j\Omega\mu}) J_{vv} \underline{W}(e^{j\Omega\mu})$ in the numerator of Equation 1.6 will then be equal to 1. The spatial filter may then act on the microphone and is therefore not a postfilter for a beamformer.

As is discussed above, in existing methodologies, CDR is used only for post filtering. In contrast, embodiments of CDR process 10 may use the CDR in the context of noise reference estimation. Accordingly, the teachings of the present disclosure provide a more flexible and simpler to configure solution compared to state-of-the art beamforming. In this way, it relies on fewer assumptions and it is also applicable for non-array arrangements of microphones. Embodiments of CDR process 10 may also be extended for dereverberation.

Figure 9:
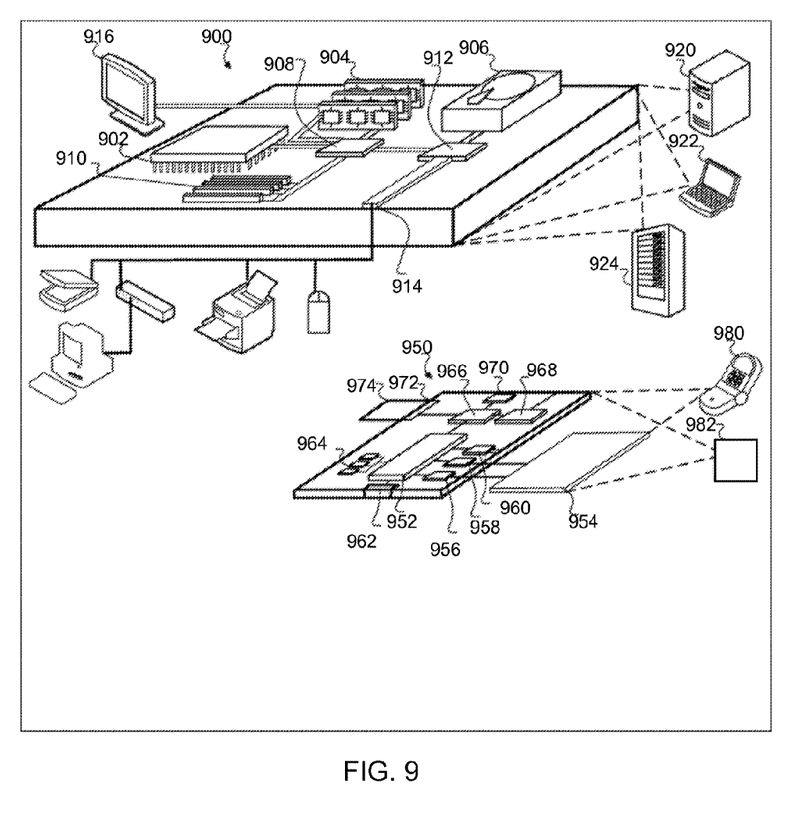
FIG. 9 shows an example of a computer device and a mobile computer device that can be used to implement embodiments of the present disclosure.

Referring now to FIG. 9, an example of a generic computer device 900 and a generic mobile computer device 950, which may be used with the techniques described here is provided. Computing device 900 is intended to represent various forms of digital computers, such as tablet computers, laptops, desktops, workstations, personal digital assistants, servers, blade servers, mainframes, and other appropriate computers. In some embodiments, computing device 950 can include various forms of mobile devices, such as personal digital assistants, cellular telephones, smartphones, and other similar computing devices. Computing device 950 and/or computing device 900 may also include other devices, such as televisions with one or more processors embedded therein or attached thereto as well as any of the microphones, microphone arrays, and/or speakers described herein. The components shown here, their connections and relationships, and their functions, are meant to be exemplary only, and are not meant to limit implementations of the inventions described and/or claimed in this document.

In some embodiments, computing device 900 may include processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, may be interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

Memory 904 may store information within the computing device 900. In one implementation, the memory 904 may be a volatile memory unit or units. In another implementation, the memory 904 may be a non-volatile memory unit or units. The memory 904 may also be another form of computer-readable medium, such as a magnetic or optical disk.

Storage device 906 may be capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

High speed controller 908 may manage bandwidth-intensive operations for the computing device 900, while the low speed controller 912 may manage lower bandwidth-intensive operations. Such allocation of functions is exemplary only. In one implementation, the high-speed controller 908 may be coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 may include a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, may be interconnected using various buses, and several of the components may be mounted on a common motherboard or in other manners as appropriate.

Processor 952 may execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

In some embodiments, processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

In some embodiments, memory 964 may store information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

Computing device 950 may be implemented in a number of different forms, as shown in the figure. For example, it may be implemented as a cellular telephone 980. It may also be implemented as part of a smartphone 982, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving an audio signal at one or more microphones; and
controlling one or more adaptive filters of a beamformer using a coherent to diffuse ratio ("CDR") by determining speech and speech pause based upon the CDR, and adapting one of a blocking filter of the one or more adaptive filters during the speech and an interference cancellation filter of the one or more adaptive filters during the speech pause.

2. The computer-implemented method of claim 1, wherein the CDR is estimated and mapped to a control variable.

3. The computer-implemented method of claim 1, wherein the CDR is combined with at least one of a signal to noise ratio ("SNR") and a signal power ratio ("SPR").

4. The computer-implemented method of claim 1, wherein controlling occurs in a generalized sidelobe canceller ("GSC") type beamformer.

5. The computer-implemented method of claim 1, further comprising:
controlling an update associated with the interference cancellation filter.

6. The computer-implemented method of claim 1, wherein the CDR is configured to suppress late reverberation prior to direction of arrival ("DOA") estimation.

7. The computer-implemented method of claim 1, wherein the CDR is used as a spectral weight in a generalized cross correlation.

8. The computer-implemented method of claim 1, wherein the CDR is used to detect at least one signal component for T-60 estimation.

9. The computer-implemented method of claim 1, further comprising:
estimating a power spectral density associated with one of a post-beamforming noise and a microphone signal used in a spatial postfilter.

10. The computer-implemented method of claim 1, further comprising:
generating a CDR-based overestimation factor for a noise power spectral density.

11. The computer-implemented method of claim 9, wherein estimating includes suppressing a coherent sound part in the power spectral density using a spectral CDR that refers to one of an output of the blocking matrix and an error of the blocking filter.

12. A system comprising:
one or more processors and one or more microphones configured to receive an audio signal, the one or more processors configured to control one or more adaptive filters of a beamformer using a coherent to diffuse ratio ("CDR") by determining speech and speech pause based upon the CDR, and adapting one of a blocking filter of the one or more adaptive filters during the speech and an interference cancellation filter of the one or more adaptive filters during the speech pause.

13. The system of claim 12, wherein the CDR is estimated and mapped to a control variable.

14. The system of claim 12, wherein the CDR is combined with at least one of a signal to noise ratio ("SNR") and a signal power ratio ("SPR").

15. The system of claim 12, wherein controlling occurs in a generalized sidelobe canceller ("GSC") type beamformer.

16. The system of claim 12, further comprising:
controlling an update associated with the interference cancellation filter.

17. The system of claim 12, wherein the CDR is configured to suppress late reverberation prior to direction of arrival ("DOA") estimation.

18. The system of claim 12, wherein the CDR is used as a spectral weight in a generalized cross correlation.

19. The system of claim 12, wherein the CDR is used to detect at least one signal component for T-60 estimation.

20. The system of claim 12, further comprising:
estimating a power spectral density associated with one of a post-beamforming noise and a microphone signal used in a spatial postfilter.

21. The system of claim 12, further comprising:
generating a CDR-based overestimation factor for a noise power spectral density.

22. The system of claim 20, wherein estimating includes suppressing a coherent sound part in the power spectral density using a spectral CDR that refers to one of an output of the blocking matrix and an error of the blocking filter.

* * * * *